(12) United States Patent
Hetzler et al.

(10) Patent No.: US 6,891,694 B2
(45) Date of Patent: May 10, 2005

(54) METHOD FOR WRITING STREAMING AUDIOVISUAL DATA TO A DISK DRIVE

(75) Inventors: Steven R. Hetzler, Los Altos, CA (US); Daniel F. Smith, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 248 days.

(21) Appl. No.: 10/227,494

(22) Filed: Aug. 23, 2002

(65) Prior Publication Data

US 2004/0036997 A1 Feb. 26, 2004

(51) Int. Cl.$^7$ .............................. G11B 5/596
(52) U.S. Cl. .................. 360/78.04; 360/77.02
(58) Field of Search ................ 360/78.04, 77.02, 360/16, 48, 69, 40, 50, 53, 54, 62, 71, 77.04; 711/4, 112; 365/45, 47.31, 47.33, 53.41

(56) References Cited

U.S. PATENT DOCUMENTS

| | | | | |
|---|---|---|---|---|
| 5,244,705 A | * | 9/1993 | Tsurushima et al. | 428/64.4 |
| 5,528,569 A | * | 6/1996 | Fujiie et al. | 369/47.31 |
| 5,615,190 A | * | 3/1997 | Best et al. | 369/53.41 |
| 5,640,378 A | * | 6/1997 | Arai et al. | 369/47.33 |
| 5,768,236 A | * | 6/1998 | Kihara | 369/124.14 |
| 5,856,930 A | * | 1/1999 | Hosono | 345/719 |
| 5,889,795 A | * | 3/1999 | Niijima et al. | 714/766 |
| 5,914,707 A | * | 6/1999 | Kono | 345/173 |
| 6,105,104 A | * | 8/2000 | Guttmann et al. | 711/4 |
| 6,366,980 B1 | * | 4/2002 | Haines et al. | 711/112 |
| 6,388,908 B1 | * | 5/2002 | Araki et al. | 365/45 |
| 6,466,385 B1 | * | 10/2002 | Umeda et al. | 360/16 |
| 6,496,311 B1 | * | 12/2002 | Sato et al. | 360/48 |
| 6,574,774 B1 | * | 6/2003 | Vasiliev | 714/800 |
| 6,614,615 B1 | * | 9/2003 | Ju et al. | 360/78.04 |
| 6,621,782 B1 | * | 9/2003 | Nakane et al. | 369/53.1 |
| 6,639,885 B1 | * | 10/2003 | Yada et al. | 369/53.45 |
| 6,690,882 B1 | * | 2/2004 | Hanmann et al. | 386/125 |
| 6,697,958 B1 | * | 2/2004 | Yada et al. | 714/6 |
| 6,725,395 B2 | * | 4/2004 | Ono et al. | 714/8 |

FOREIGN PATENT DOCUMENTS

| | | | | |
|---|---|---|---|---|
| JP | | 10302390 | 11/1998 | G11B/20/10 |
| JP | WO 03071534 A1 | | 8/2003 | G11B/20/10 |

* cited by examiner

Primary Examiner—Sinh Tran
Assistant Examiner—Fred F. Tzeng
(74) Attorney, Agent, or Firm—Thomas R. Berthold

(57) ABSTRACT

A method for writing streaming audiovisual data to a disk drive is performed by organizing the data into clusters and commencing writing the clusters to the first physical sector encountered after the read/write head has settled to the desired track on the rotating disk. A cluster contains a number of data blocks corresponding to the number of physical sectors in an integer number of tracks on the disk, so that the writing of a single cluster is the writing to an integer number of full tracks on the disk. Even though the disk drive may have a physical index to identify the first physical sector in all the tracks, the writing of cluster data takes place without regard to index position. During interleaving of audiovisual data, when multiple recording tasks are cycled until all the tasks are completed, the clusters in the first portion of the first task are written during the first interleave period, the head is then positioned to another track where the clusters in the first portion of the second task are written during the next interleave period, beginning with the first physical sector encountered by the head, again without waiting for index. The location where the first block of cluster data has been written is identified by writing a block number into the physical sector or by writing a start of cluster indicator on the track where the cluster is written.

12 Claims, 6 Drawing Sheets

METHOD FOR WRITING STREAMING AUDIOVISUAL DATA TO A DISK DRIVE

TECHNICAL FIELD

This invention relates generally to magnetic recording disk drives, and more particularly to disk drives optimized for writing and reading audio and/or visual (audiovisual or "AV") data.

BACKGROUND OF THE INVENTION

In a conventional magnetic recording disk drive used in the computer data processing environment the data is stored on the disks in fixed length (fixed number of bytes) physical sectors in a format called fixed block architecture (FBA). In a FBA disk drive, the concentric data tracks on the disks have a common index, which represents the start of the tracks, and each sector on each track has a physical sector number or address. Current disk drives in the computer data processing environment are characterized by random access patterns and small blocks of data. In contrast, in the AV environment the data processing is characterized by streams of large sequential blocks of data, and by the interleaving of multiple streams. For example, AV data stream interleaving allows a digital video recorder (DVR) to record and play back real-time television and to record two television programs simultaneously.

The benchmark for data storage in the AV environment is based on cost per unit of performance. The AV disk drive data workload is categorized by a dominance of large reads and writes, interspersed with small reads and writes that may post frequently but contain only small amounts of data. A disk drive, therefore, may find itself spending a significant time waiting due to rotational latency, i.e., the time delay required for the write head to wait for the disk to rotate until the index is detected before the next write can occur.

Another aspect of the AV environment is that if there is an uncorrectable error in a data sector on the disk, there is no time to re-read the data. Instead, the DVR will note that the data is incorrect, and attempt to conceal the missing bytes, such as by freezing the AV stream briefly to mask the error.

What is needed is an AV-optimized disk drive that does not suffer from delays caused by rotational latency and re-reading the data in the event of a data error.

SUMMARY OF THE INVENTION

The invention is a method for writing streaming audiovisual data to a disk drive by organizing the data into clusters and commencing writing the clusters to the first physical sector encountered after the read/write head has settled to the desired track on the rotating disk. A cluster contains a number of data blocks corresponding to the number of physical sectors in an integer number of tracks on the disk, so that the writing of a single cluster is the writing to an integer number of full tracks on the disk. Even though the disk drive may have a physical index to identify the first physical sector in all the tracks, the writing of cluster data takes place without the need for index.

During interleaving of audiovisual data, when multiple recording tasks are cycled until all the tasks are completed, the clusters in the first portion of the first task are written during the first interleave cycle or period, and the head is then positioned to another track where the clusters in the first portion of the second task are written during the next interleave period, beginning with the first physical sector encountered by the head, again without waiting for index.

The location where the first block of cluster data has been written is identified by writing a block number into the physical sector or by writing a start of cluster indicator on the track where the cluster is written.

Because the audiovisual data is written in full-track cluster increments, parity sectors for error correction can be computed on-the-fly without incurring a significant performance hit. Second level error correction for each of the individual data sectors can be eliminated because the loss of one or more entire sectors can be covered by parity associated with the entire cluster.

For a fuller understanding of the nature and advantages of the present invention, reference should be made to the following detailed description taken together with the accompanying figures.

DETAILED DESCRIPTION OF THE INVENTION

In the present invention the basic unit for the AV stream data is an integer multiple of full tracks on the disk, referred to as a cluster. If the integer multiple is 1, then one full track unit is the cluster. All writes of data are therefore full track writes. The data cluster is broken down into an integer number of fixed-length data blocks, as in the conventional FBA format. The data blocks in a cluster contain the AV data, and at least one of the data blocks in the cluster can contain error correction information computed from a group of data blocks containing the AV data. Since the cluster is an integer multiple of full tracks, then the number of blocks in a cluster is equal to the number of physical sectors in all the tracks making up the cluster.

Figure 1:
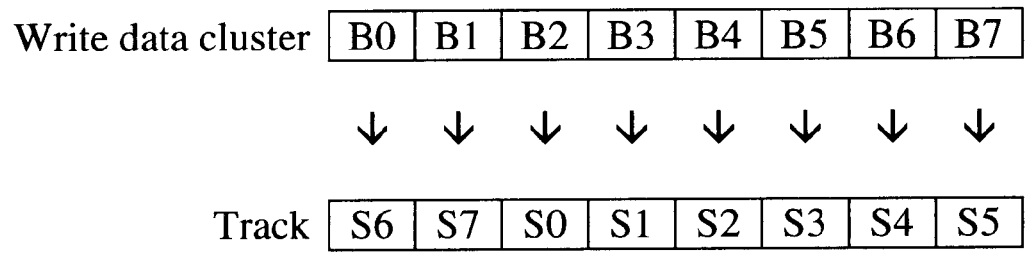
FIG. 1 shows a single-track cluster of eight fixed-length logical blocks (B0 . . . B7) associated with eight physical sectors (S6 . . . S5) of a single data track on a disk.

The data are written to the physical sectors in the track without the prior art association between the logical block address and the physical sector number on the track. FIG. 1 shows an example single-track cluster of eight fixed-length logical blocks B0 . . . B7, each of which is the size of one physical data sector. These blocks are written to the data track such that block B0 is written to data sector S6, block B1 is written to data sector S7, and so on as shown. The sectors S0 . . . S7 are the physical sectors on the track. Sector S0 holds data block B2. In a conventional FBA format, sector S0 would hold block B0, S1 would hold block B1, and so on.

Figure 2:
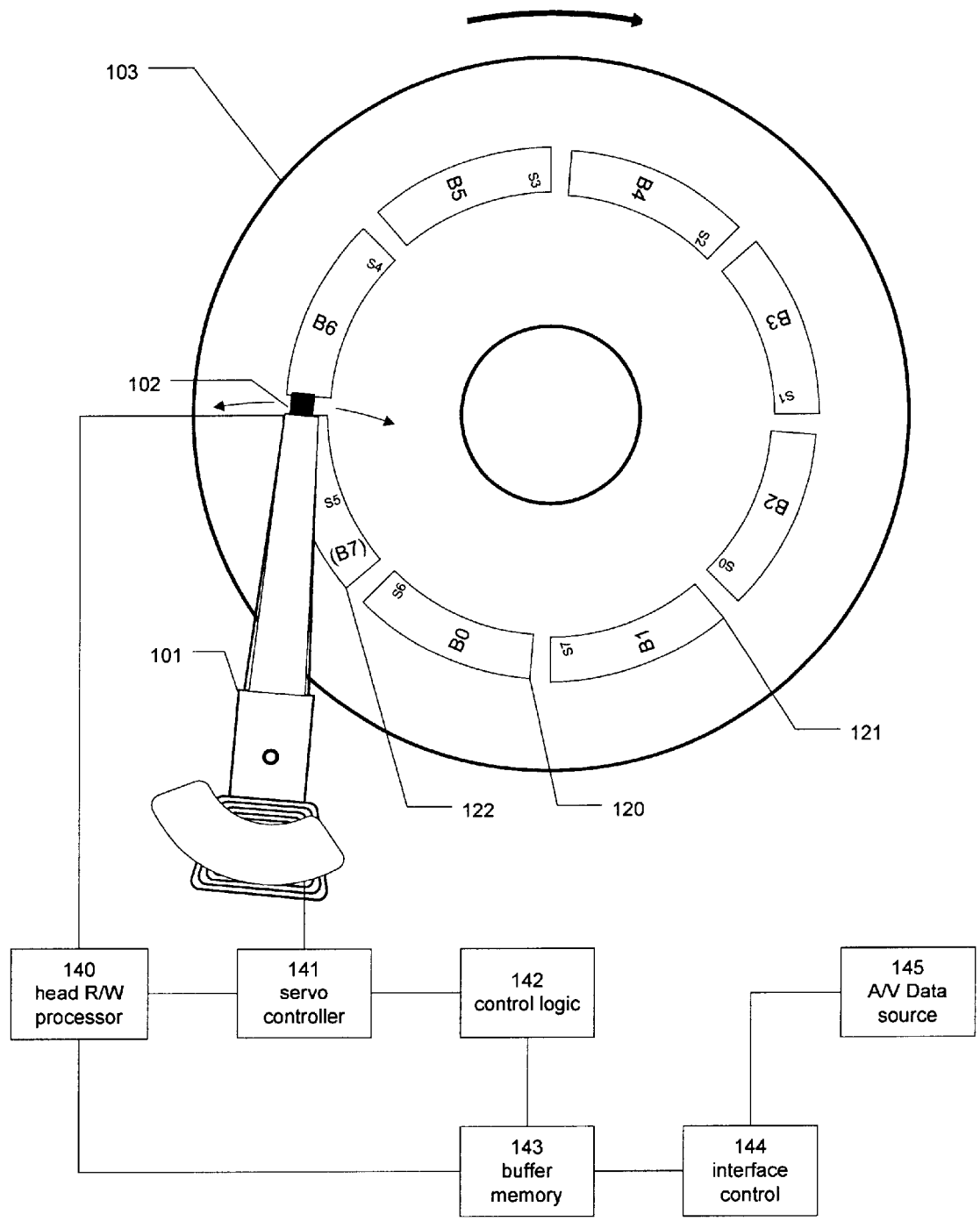
FIG. 2 is a schematic of a disk drive illustrating a single track with the physical sectors containing the recorded logical blocks of data.

FIG. 2 is a block diagram illustrating the method for writing the logical blocks to the physical sectors. The disk drive actuator arm 101 moves the read/write (R/W) head 102 generally radially (as shown by the arrows next to head 102) across the disk 103, positioning it to the desired data track. A data track containing physical sectors S0 . . . S7 is shown on disk 103. In the preferred embodiment each physical sector has a sector number or address recorded at the beginning of the sector. These sector numbers are recorded at the time of disk formatting, when the servo positioning information is recorded. However, a key aspect of the present invention is that the format is "indexless", i.e., there is no requirement for a physical index mark identifying the beginning of the track. Even though there is an initial physical sector number S0 on each track, this sector is not used to identify the beginning of the cluster on the track. When an AV data cluster, containing logical blocks B0 . . . B7, is written to a free track, the first data block B0 is written to the first physical sector encountered by the R/W head 102, thereby minimizing the rotational latency that would occur if the R/W head had to wait for index or for a specific physical sector.

When a write operation begins, the R/W head 102 is moved to a data track previously identified to control logic 142 as being a track having free space. This "seek" to the desired track is performed by the head 102 reading the pre-recorded servo positioning information from the disk and the head R/W processor 140 signaling the servo controller 141 to move the actuator arm 101 the desired direction and distance. While this seek operation is taking place, the data stream from the AV data source 145 (e.g., digital TV, DVR) is transferred through the interface controller 144, organized into data clusters by control logic 142 and loaded into buffer memory 143.

The buffer 143 is used to hold write data received from the AV data source 145. In general, the size of the buffer 143 will be greater than 1 cluster. A host data stream is typically transmitted as a set of data blocks with a starting address and a length. In some streaming systems, such as object or file-based streams, where the command consists of an object identifier, the data set, an offset address and a length, the starting address is the sum of the base address of the identified object and the offset address. The location in buffer 143 used to store the data blocks is determined from the starting address. Since data is written to empty clusters on the disk, the cluster is selected from the set of clusters identified as being empty, typically contained in a free space table. When there are multiple streams, the host should identify the stream the data belongs to, such as by using an object identifier.

It is beneficial to start a stream on a cluster boundary, and sequentially place further data in clusters. The data in a cluster buffer is organized into a set of sequential blocks.

The write operation can begin before all the data for the cluster has been received into buffer 143. When the head 102 is positioned and settled for writing, the first block B0 of the cluster is written to the first physical sector encountered, shown as S6 in FIGS. 1 and 2. This sector S6 now becomes the first sector of the cluster. The remaining cluster data blocks B1 . . . B6 are then written sequentially into physical sectors S7 and S0 . . . S5 (with FIG. 2 showing that block B7 has not yet been written because physical sector S5 has not yet passed beneath head 102) until the complete cluster is written into the full track.

Figure 3:
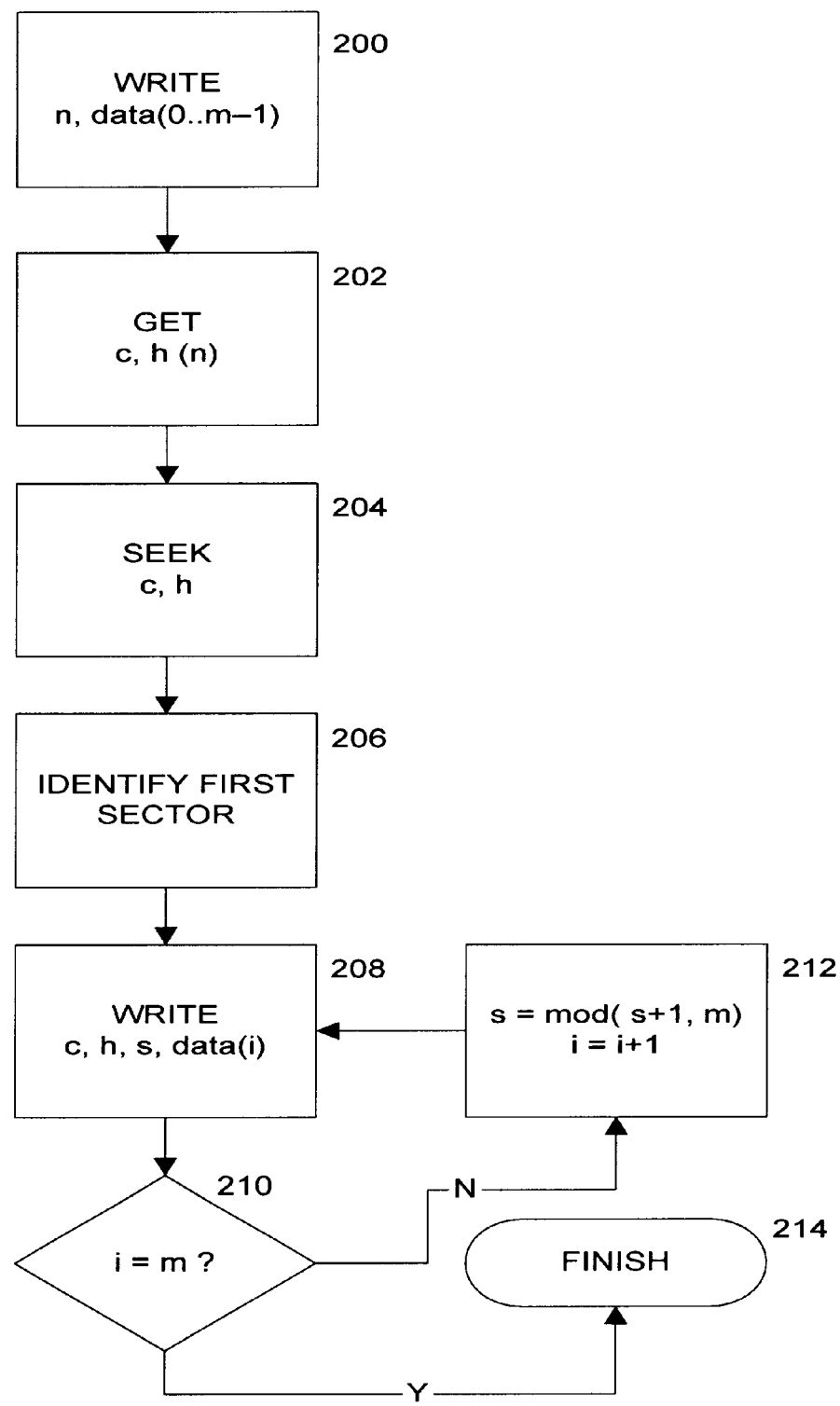
FIG. 3 is a flow chart illustrating the process for writing a single data cluster.

FIG. 3 shows the basic write operation in the present invention. The initial steps in the process involve setting up the disk drive for the transfer of the data from the AV data source. The read or write command to a cluster, designated n, proceeds with a cluster of data blocks numbered 0 to m−1 (in the example described and shown in FIG. 2, m=8), as shown at 200. The control logic 142 calculates the track (c, h) on the disk drive for the cluster n (202). (Since most disk drives have multiple disks with a R/W head associated with a specific disk surface, the head is identified as "h" and the track associated with that head is identified by cylinder "c" which identifies all the tracks on the stack of disks that line up in a "cylinder"). The drive is then instructed to seek to this track (204).

The servo controller 141 and control logic 142 identifies the first physical sector encountered and the location where the first block of the cluster will be stored for this track (206). The first block B0 is then written to the first physical sector encountered (S6 in the example of FIG. 2) and subsequent data blocks in the cluster are then written into the successive physical sectors (208). This occurs sequentially to the rest of the track (210, 212) until the cluster is completely written (214). Not shown is the process of updating the drive's internal tables, including the location of the physical sector that is the start of the cluster, to allow later retrieval of the data and the identification of empty clusters. In one embodiment, the starting sector of the cluster can be identified because the identity of each data block (B0 . . . B7) is written into the physical sector where the data block is located.

Any type of file system or free space manager may be used to keep track of the empty clusters, and the location of the free space is known to the control logic 142. For example, a conventional file allocation table (FAT) based system would use a cluster size that is a multiple of a track size. For disk drives with zoned-recording architecture the track capacity, and hence the cluster size, will vary according to zone. In a zoned drive, this will require adjusting the storage unit size accordingly (e.g., 250 data blocks/physical sectors per cluster in one zone, and 240 data blocks/physical sectors per cluster in another zone).

When the AV data stream contains multiple clusters, then writes are handled as a series of independent single cluster writes, but preferably to a series of nearby or adjacent tracks. A data write that is not exactly one cluster length is rounded up to a whole cluster length.

By writing the cluster to the first physical sector that passes beneath the write head once the head has settled on the desired track, the present invention provides significant advantages where interleaving is used. During interleaving the multiple recording and/or playback tasks are cycled, until all the tasks are completed. When recording data, at the beginning of each cycle, the next portion of the data is again written to the first available sector, without waiting for index. For example, in a DVR, two video streams may be being recorded simultaneously.

Figure 4A:
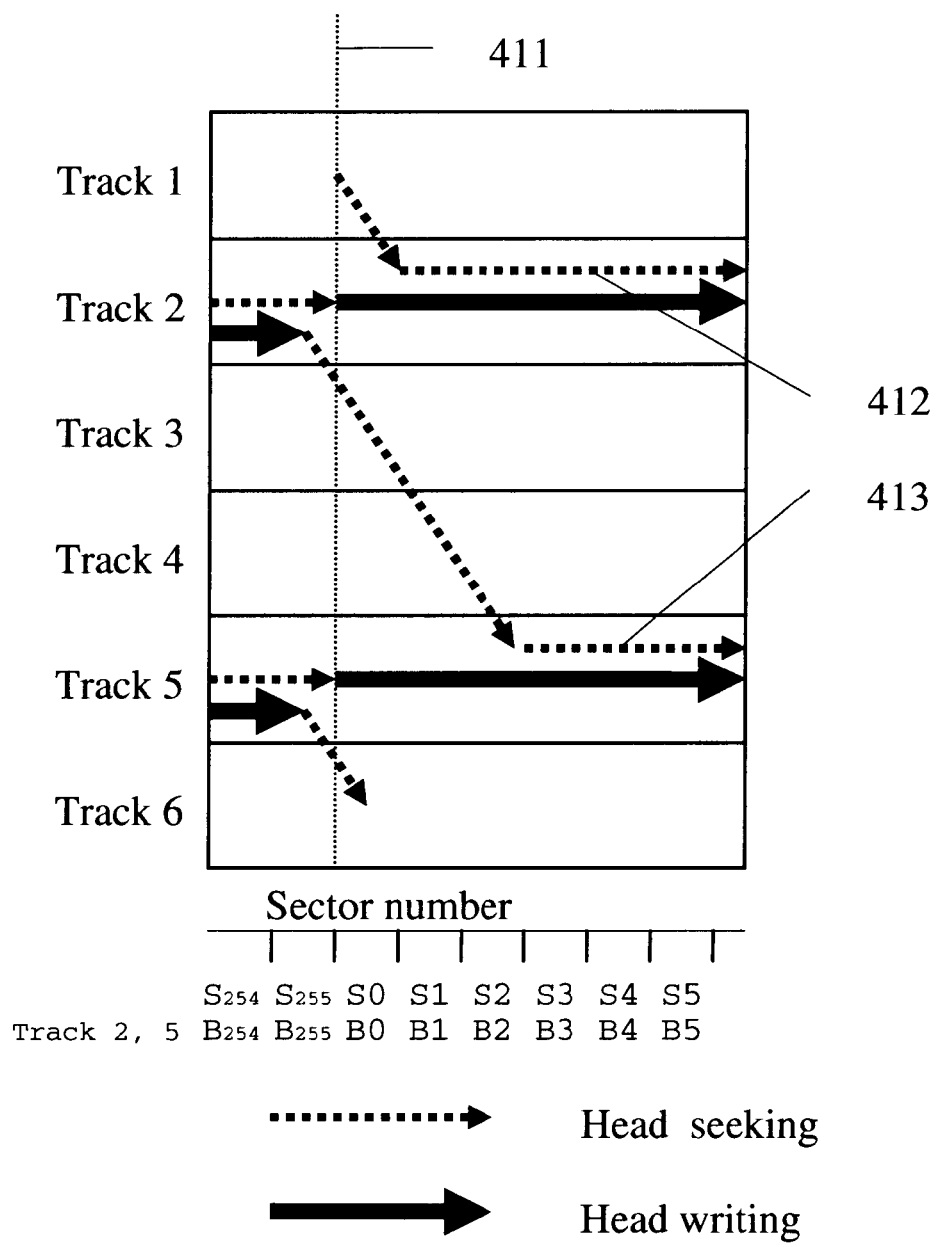
FIG. 4A shows the prior art process for writing the logical blocks of two interleaved data streams to the physical sectors that requires waiting for index for each track.
Figure 4B:
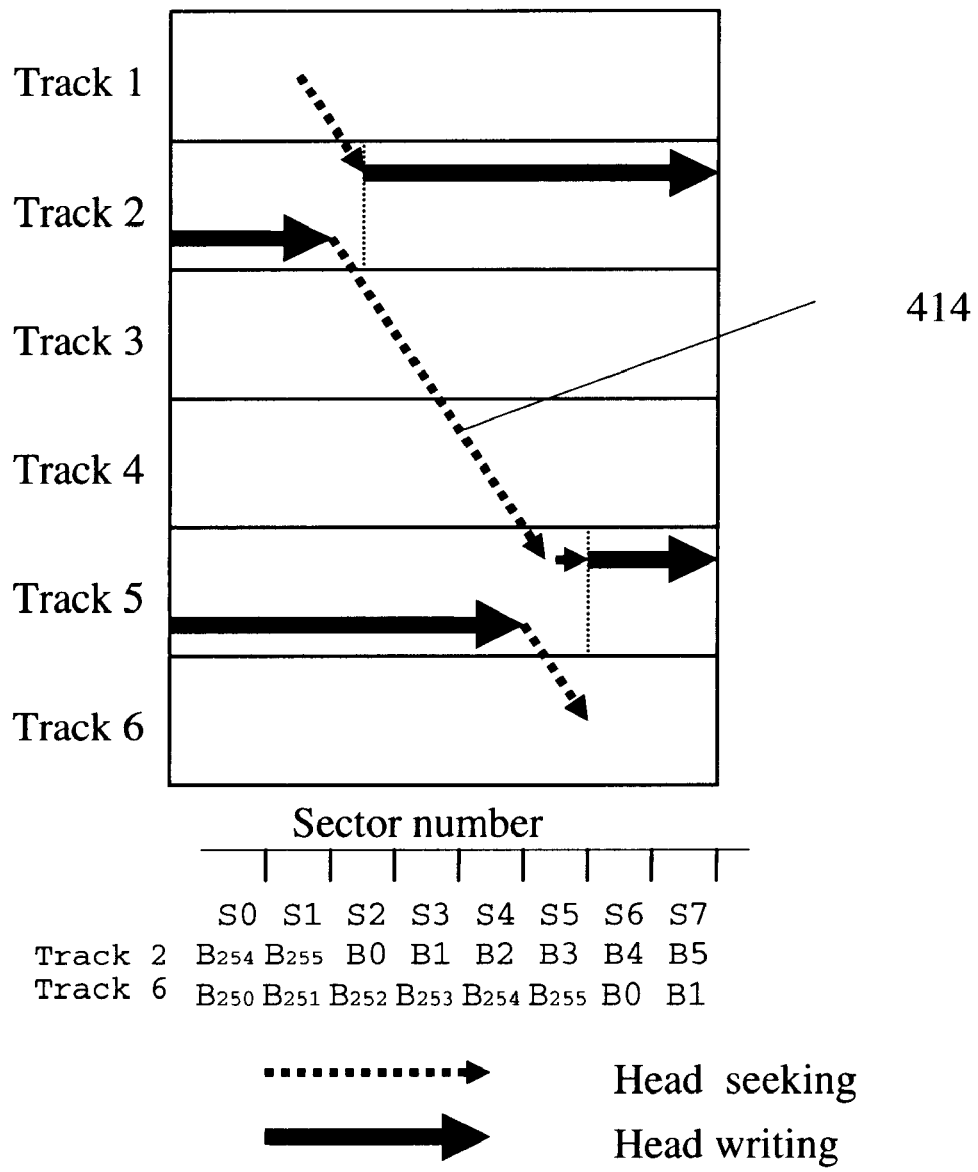
FIG. 4B shows the process of the present invention for writing the logical blocks of two interleaved data streams to the first physical sector encountered after completion of seeking to the desired tracks.

The advantage is illustrated in FIGS. 4A–4B, which shows a group of tracks with different tasks associated with the tracks for an example where there are 256 data blocks (B0 . . . B255) in a cluster. A sequence of two interleaved cluster writes is shown with the prior art FBA in FIG. 4A, and the indexless format of the present invention in FIG. 4B. Examining a two-cluster write first in FIG. 4A, it is seen that the drive must wait for the index sector 411 to come under the head before writing the first logical data block B0 of the first cluster to the first physical sector after index (S0) in track 2. This unutilized time (seek time and rotational latency) is shown as dashed line 412. There will be a further latency after the drive completes writing the first cluster and then seeks from track 2 to track 5 to write the second cluster there, because of the need to again wait for index 411. This unutilized time is shown as dashed line 413. In the new indexless format of FIG. 4B, the head is able to start writing the first data block B0 to a new sector as soon as the head has settled on track 2. This is shown as physical sector S2. Moreover, the writing of the second cluster to the first physical sector encountered on track 5 (sector S6) removes the second latency. The only delay between the completion of writing the first interleaved cluster and the beginning of writing the second interleaved cluster is the time to seek to and settle on the new track, shown as dashed line 414. Whereas the prior art scheme of FIG. 4A took 4 disk revolutions (2 to write the full track clusters and 2 for latency awaiting index) to complete the interleaving task, the indexless scheme of FIG. 4B took between 2 and 3 (2 to write the full track clusters and less than 1 to seek between the tracks). In addition, if the data clusters at tracks 2 and track 5 were not interleaved but were from the same AV data stream, then when the data stream is read back, the track skew is already configured optimally (i.e., the head can read immediately after seeking from track 2 to track 5). This reduces delays in reading.

In the preferred embodiment described above the physical sectors have address numbers so the sector number of the first sector encountered after the head settles from a seek is read and associated with logical data block B0. There are alternative methods to write to the first sector encountered and identifying that sector as the beginning of the recorded cluster. This can be done in a number of ways:

Write the block number (B0 . . . B255) into the physical sectors,

Write a start of cluster indicator on the track (e.g., within one of the physical sectors), Keep the start of cluster location in memory, and store this information in a special location on the drive (e.g., as part of the free space or file location information).

The net effect is that rotational latency has been removed for write operations, and all writes require only one revolution of the disk to complete once the head has settled on the track. For track-to-track seeks and head switches, which would be required when recording multiple-cluster data, the present invention is optimal because the first sector encountered on a new track is the one where writing continues, without waiting for index or a preset skew.

Read operations are unaffected, and may still be performed as zero-latency operations. The first physical sector encountered during a read operation will tend to be random following a seek. Therefore, the randomization introduced in the write operation will have no net effect. When the head arrives on track, it begins to read sectors as they are encountered. For host systems requiring in-order data delivery, data can be shipped to the host once the first cluster sector has been read.

An important feature of the present invention is the ability to add on-track parity sectors without incurring a read/modify/write performance penalty. IBM's U.S. Pat. No. 5,737,344 discloses the use of parity sectors on a data track for protection of data sectors. In the present invention, because the data is written in full-track cluster increments, the parity sectors can be computed on-the-fly without incurring a significant performance hit. Further, the second level error correction code (ECC) on the data sectors, and any other overheads on each sector, such as dual sync, can be eliminated, because now the loss of one or more entire sectors can be covered by parity. Since a track typically has more than 200 sectors, adding 2 parity sectors per track incurs a loss of 1% in capacity, which is more than compensated for by the removal of the second level ECC (1.2% per byte per interleave) and dual sync (4–5%). Any sector not corrected by the first level ECC, or that fails to sync, is corrected on-the-fly from the parity sectors.

Figure 5A:
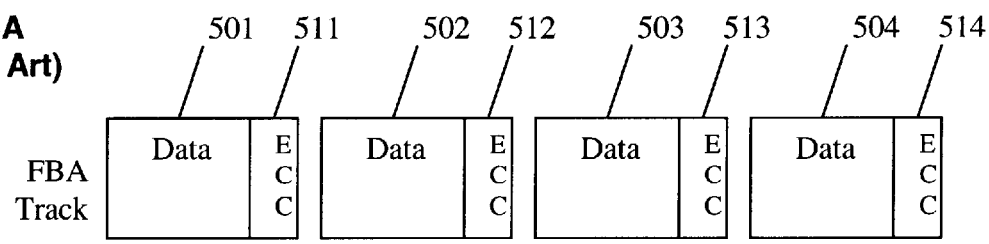
FIG. 5A shows the layout of data and error correction code (ECC) on a track in the prior art FBA.
Figure 5B:
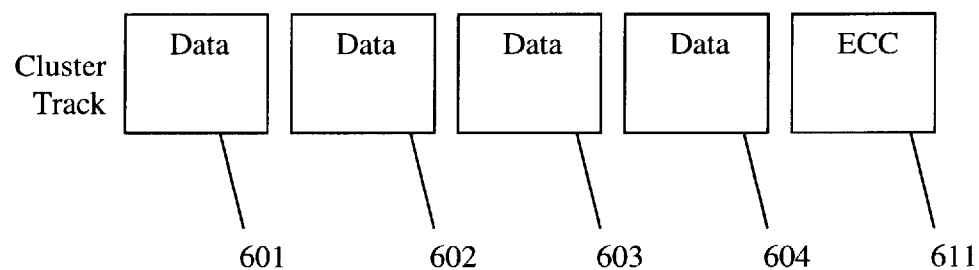
FIG. 5B shows the layout of data and error correction code (ECC) on a track in the cluster architecture of the present invention.

FIG. 5A shows the ECC scheme for the prior art FBA architecture and FIG. 5B shows the ECC for the AV cluster architecture of the present invention. In the FBA system (FIG. 5A), each physical sector 501–504 can be accessed individually, and thus each must be protected by a second level ECC (511–514, respectively) to ensure data integrity. In the cluster architecture of the present invention (FIG. 5B), the data is processed in clusters, even though a cluster is written into contiguous physical sectors 601–604. Because of this the ECC sector 611 can be applied to the cluster as a whole, leaving the individual sectors 601–604 unencumbered by a secondary ECC. The ECC sector 611 will cover for the loss of any one of the sectors 601–604.

Current hard disks are usually specified to have a hard error rate of approximately 1 bit in error for every $10^{13}$ bits read (an error rate of $10^{-13}$). In the cluster architecture of the present invention, assuming a raw bad sector rate (no sync or first level ECC failed) of $10^{-5}$, with 2 parity sectors per 200 data sectors, the probability of a track having uncorrected sectors is $10^{-9}$. This corresponds to a hard bit error rate delivered to the host of $10^{-17}$. Therefore, the present invention is substantially more reliable than current disk drives.

When a data sector has errors that the first level ECC can't correct (the sector cyclic redundancy check fails), or if the sync information can't be read, the missing sector will be corrected prior to transmission of the data to the host. Once all the data sectors in the parity group have been read, up to 2 bad sectors can be re-constructed without requiring a re-read of the data. Further, since the locations of the errors are known to the drive (they are technically called erasures), the reconstruction procedure can be accomplished in roughly a sector time following the completion of reading the track. This will provide a substantial performance benefit over current error recovery procedures, such as re-tries and software ECC correction. Such behavior is critical for real-time streaming data flow.

There are various schemes for encoding the parity information. The two preferred schemes are Reed-Solomon (RS) codes and the even-odd code. The RS code would be substantially similar to the first level ECC. The number of sectors used in a parity computation is called a parity group. If the number of sectors per parity group is limited to 255, an 8-bit symbol size with 2 check symbols (like one interleave in the data sectors) can be used as the ECC to fill 2 parity sectors. This will correct any 2 bad sectors in a parity group. The even-odd code uses a row and diagonal parity scheme to produce 2 parity sectors that can correct any 2 bad sectors in a parity group. Both schemes can be extended to an arbitrary parity group size and number of bad sectors.

In a zoned drive, the number of physical sectors per track varies from zone-to-zone; thus the number of data sectors in a parity group may also change. Further, there can be more than one parity group on a track. For example, if there are 400 data sectors on a track, it may be best to use 2 parity groups to limit the number of data sectors per parity sector. This would lead to the cluster size and the parity group size being different. There may also be variations in cluster size due to defect management (the mapping out of defective sectors on a track).

For performance measurement of the present invention an external file system using a zero-latency write scheme was used as the baseline for comparison, and assigned a 100% performance figure. In the baseline system zero latency writes do not change the location of the index sector on a track, so block Bn is written to sector Sn, but the sectors may be written out of order. Data writing can commence when the buffer contains the data block Bn when the head is over Sn. Zero latency writes take only one revolution to complete if all the blocks for a data track are in the buffer memory when the head has settled on the track, but can take more than one revolution if some of the blocks haven't been received by the time the head has settled. Since worst-case performance is of primary importance in the AV environment, an operation is defined as a full data band or zone seek plus the time to complete a write of a full track of sectors. The present invention format described above scores from 115 to 135% of baseline performance, meaning it is 15 to 35 percent faster in performing the write operation. If the cluster size is selected be 3 full tracks, the score improves to 179 to 211%. While the larger cluster size has a dramatic impact on throughput, it requires a proportionally larger buffer.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A method for writing data from a host to a disk drive, the disk drive having a head for writing data and a disk with a plurality of data tracks, each data track having a plurality of physical sectors, the method comprising:

receiving a data stream from the host;

organizing the data stream into a plurality of data clusters, each cluster having a plurality of data blocks wherein the number of blocks in a cluster is equal to an integer multiple of the number of sectors in a track;

positioning the head to the track where writing of the data stream is to begin;

writing the first block of the first cluster to the first physical sector encountered by the head after the head has been positioned to the track; and writing subsequent blocks of the first cluster to successive physical sectors encountered by the head.

2. The method of claim 1 further comprising, after writing the first cluster, positioning the head to a second track writing the first block of the second cluster to the first physical sector encountered by the head after the head has been positioned to the second track and writing subsequent blocks of the second cluster to successive physical sectors encountered by the head.

3. The method of claim 1 further comprising storing physical sector location information for at least one of the blocks.

4. The method of claim 3 wherein storing location information comprises writing a block number into the physical sector where said block is written.

5. The method of claim 3 wherein storing location information comprises writing a start of cluster indicator on the track where the cluster is written.

6. The method of claim 1 wherein at least one of the data blocks in each cluster contains error correction information and wherein organizing the data stream into a plurality of data clusters includes computing error correction information for each cluster from a group of data blocks in each said cluster.

7. The method of claim 6 wherein computing error correction information comprises computing parity information.

8. The method of claim 6 wherein computing error correction information comprises computing a Reed-Solomon error correction code.

9. The method of claim 1 wherein said integer multiple is 1, whereby all of the data blocks in the first cluster are written to physical sectors in the same track.

10. The method of claim 1 wherein said integer multiple is at least 2, and wherein writing subsequent blocks to successive physical sectors comprises writing until the physical sectors in the first track have been filled, and then successively positioning the head to an adjacent track and writing to successive physicals sectors in said adjacent track until all the blocks in the first cluster have been written.

11. The method of claim 1 wherein the host is an audiovisual system and wherein the data stream is a stream of audiovisual data.

12. The method of claim 11 wherein the stream of audiovisual data is an interleaved data stream.

* * * * *